United States Patent
Kikuchi

[11] Patent Number: 6,119,067
[45] Date of Patent: Sep. 12, 2000

[54] OBJECT DETECTING SYSTEM FOR CONVEYANCE, ETC.

[75] Inventor: Hayato Kikuchi, Wako, Japan

[73] Assignee: Honda Giken Kogyo Kabushiki Kaisha, Tokyo, Japan

[21] Appl. No.: 09/252,085

[22] Filed: Feb. 18, 1999

[30] Foreign Application Priority Data

Feb. 19, 1998  [JP]  Japan .................................. 10-054412

[51] Int. Cl.⁷ ....................................................... G01S 13/93
[52] U.S. Cl. ........................... 701/300; 701/224; 701/225; 342/46; 342/70; 342/77; 342/78; 342/158; 344/901; 344/435; 344/436
[58] Field of Search ..................................... 701/300, 301, 701/302, 224, 225, 96; 342/46, 47, 69, 70, 77, 78, 158; 340/435, 436, 901, 903, 904

[56] References Cited

U.S. PATENT DOCUMENTS

| | | | |
|---|---|---|---|
| 4,348,675 | 9/1982 | Senzaki et al. | 342/71 |
| 5,745,070 | 4/1998 | Yamada | 342/70 |
| 5,926,127 | 7/1999 | Schmidt et al. | 342/70 |
| 5,939,803 | 7/1999 | Uehara et al. | 342/70 |
| 6,020,844 | 2/2000 | Bai et al. | 342/165 |

FOREIGN PATENT DOCUMENTS

| | | |
|---|---|---|
| 5-196720A | 8/1993 | Japan . |
| 6-298002 | 10/1994 | Japan . |
| 7-287616A | 10/1995 | Japan . |
| 9-132095A | 5/1997 | Japan . |
| 9-178856A | 7/1997 | Japan . |
| 11-194165A | 7/1999 | Japan . |

*Primary Examiner*—William A. Cuchlinski, Jr.
*Assistant Examiner*—Yonel Beaulieu
*Attorney, Agent, or Firm*—Arent Fox Kinter Plotkin & Kahn PLLC

[57] ABSTRACT

An object detecting system mounted on a conveyance such as a vehicle having a laser radar as an object detector mounted on the vehicle at a position offset from the vehicle longitudinal center line, for adjusting in a factory the radar mounting position in a software manner by utilizing a computer program. A reflective target is placed ahead of the vehicle on the line extending from the vehicle longitudinal center line at a position relatively close to the vehicle in the factory. The central axis of the transmitted beam is first aimed at the target reflector such that the axis is made equal to the direction of the target reflector, and is changed by an angle of offset such that the axis is aligned with an inherently desired direction which is parallel to the vehicle longitudinal center line. With this, the radar mounting position is precisely adjusted to the desired position using a relatively short range (site) for testing and adjustment, in a software manner by utilizing a computer program, improving the efficiency of radar mounting position adjustment operation.

7 Claims, 12 Drawing Sheets

OBJECT DETECTING SYSTEM FOR CONVEYANCE, ETC.

BACKGROUND OF THE INVENTION

1. Field of the Invention

This invention relates to an object or target detecting system for a conveyance or craft such as a vehicle, which has an object detector (such as a laser radar) mounted on the vehicle, more particularly to a technique to adjust for the mounting position of the object detector.

2. Description of the Related Art

It was taught by, for example, Japanese Laid-open Patent Application Hei 6-298022 to mount an object detector such as a laser radar (lidar) on a vehicle for detecting an object or target (e.g., another vehicle running ahead on the road) so as to avoid contact therewith.

In carrying out such an object avoidance control, it is needed to accurately detect an object or target existing ahead at a distance, e.g., 100 meters from the vehicle. The object detector such as a laser radar must accordingly be mounted on the vehicle precisely in position. If the vehicle design allows a laser radar to be located at the longitudinal center line (i.e., center in the vehicle width direction) of the vehicle body, it is easy to mount a laser radar precisely in position by aligning the central axis of beam transmitted from the laser radar with the vehicle longitudinal center line.

Figure 12:
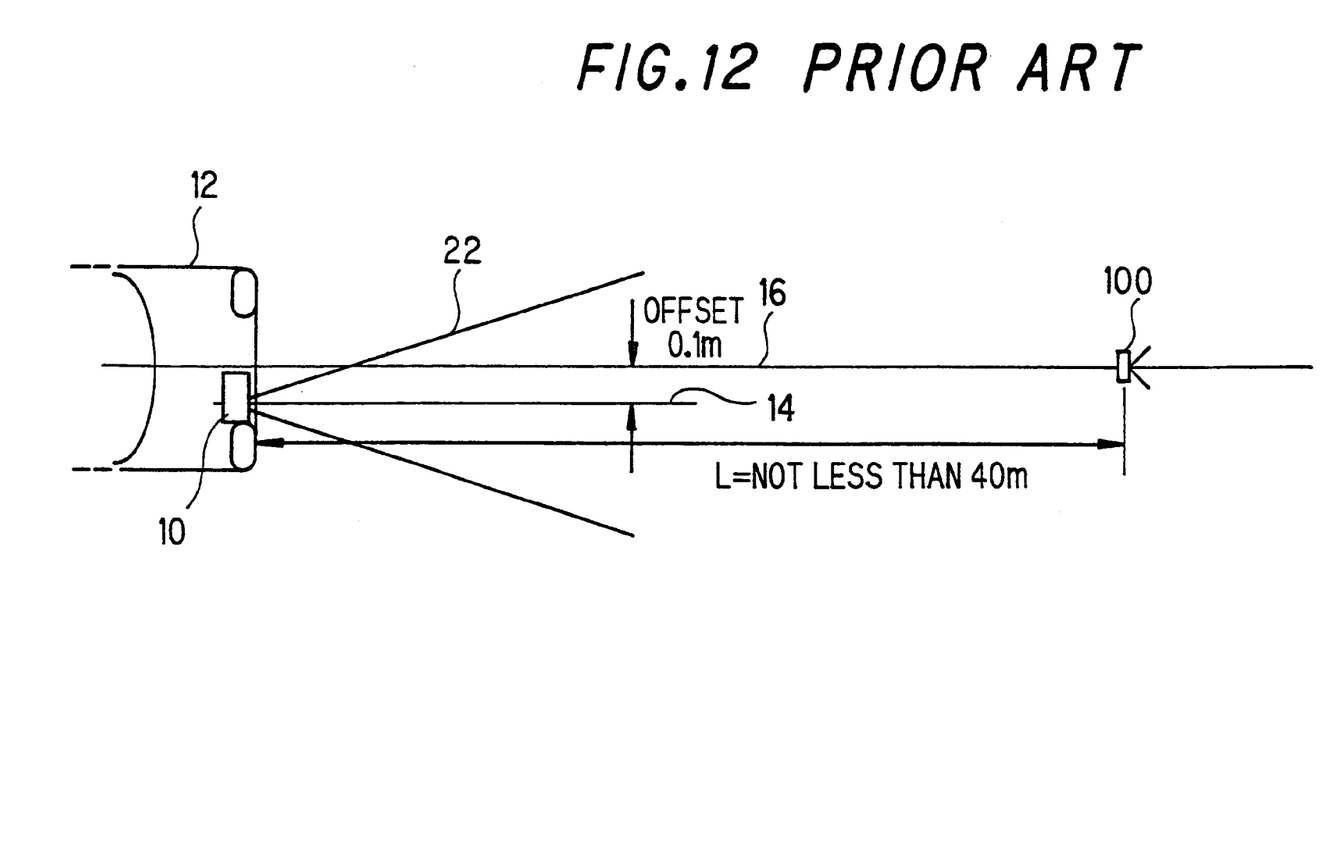
FIG. 12 is an explanatory view showing the radar mounting position adjustment in a prior art technique using a target placed 40 meters ahead of the vehicle.

However, a laser radar is often located at a position offset from the vehicle longitudinal center line for the sake of vehicle design. Accordingly, in a conventional technique to adjust for the radar mounting position, as illustrated in FIG. 12, a target reflector (referred to hereinafter as "target") 100 is placed at a distant position not less than 40 meters ahead of a vehicle 12 and the mounting position of a laser radar 10 is adjusted by aiming the radar 10 at the target 100 such that the central axis of transmitted laser beam 14 is made equal to the direction of the target 100. In the illustrated example, the laser radar 10 is mounted on the vehicle at a position 0.1 meters offset (apart) from a vehicle longitudinal center line 16.

Figure 13:
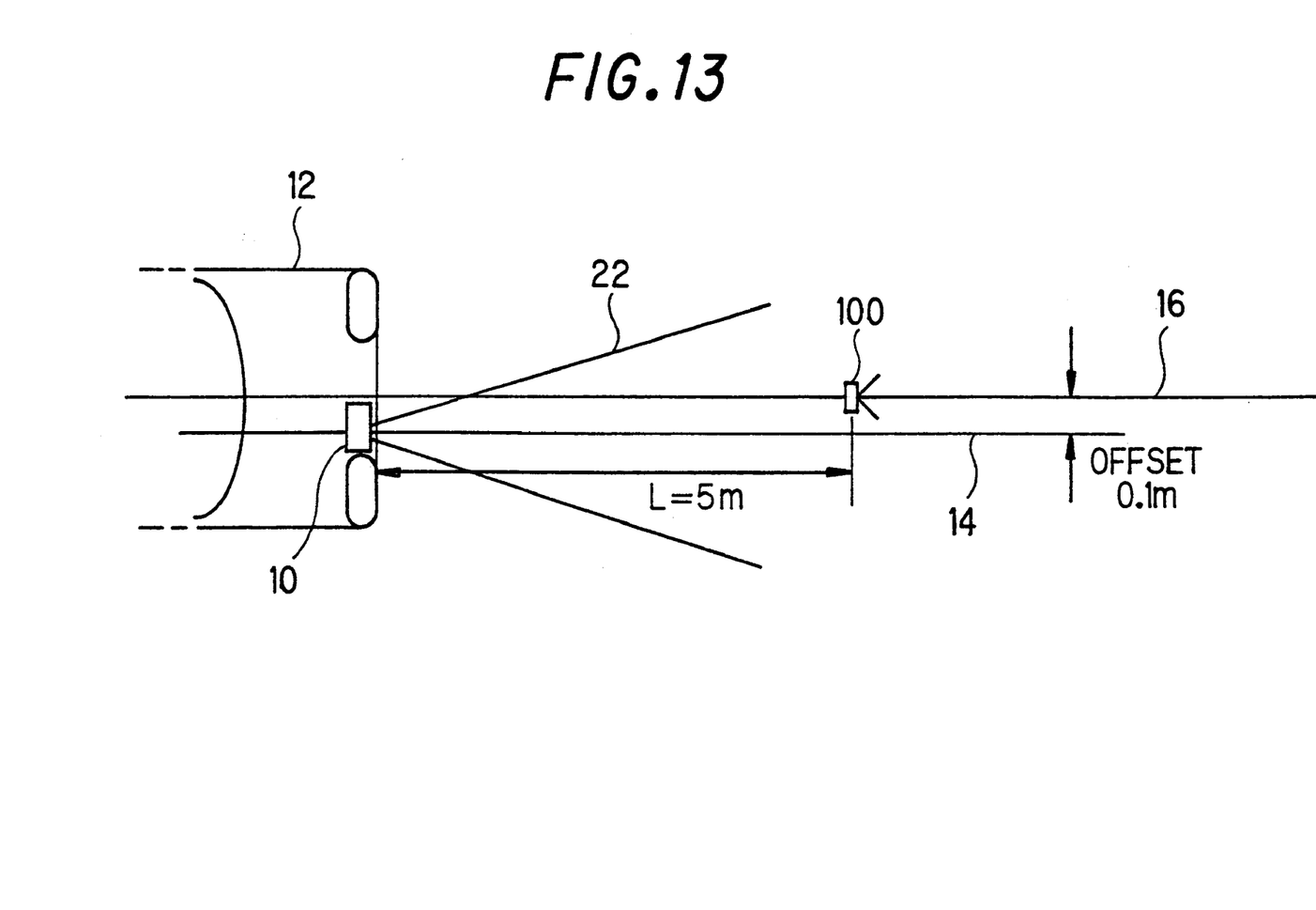
FIG. 13 is a view, similar to FIG. 12, but showing a case in which the target is placed 5 meters ahead of the vehicle.

However, it is difficult to prepare such a long range of not less than 40 meters for adjustment of in a factory vehicle assembly line or in a service center. Preferably, the range should be decreased, specifically, to 4 meters to 7 meters, for example, as shown in FIG. 13, or more specifically to 5 meters. However, when the target 100 is placed at the short distance of 5 meters ahead of the vehicle 12 to adjust for the laser radar mounting position by aiming the target 100 such that the central axis of the transmitted beam is made equal to the direction of the target 100, the influence of the offset on the position adjusting (aiming) becomes large.

To be specific, since in the conventional technique the target 100 is placed 40 meters ahead of the vehicle as illustrated in FIG. 12, the aiming error is only 2.5 milliradians (approximately $\tan^{-1}$ 0.1 meter/40 meters). Although this error increases with increasing distance and grows to 0.25 meters (in the vehicle-width direction) at 100 meters, this error of 0.25 meters is still sufficiently small compared to the standard width of traffic lane (i.e., 3.5 meters) and can accordingly be neglected.

On the other hand, if the checking range is shortened to 5 meters, the aiming error increases to 20 milliradians (approximately $\tan^{-1}$ 0.1 meters/5 meters). The error grows to 2.0 meters (in the vehicle-width direction) at 100 meters, which may sometimes result in a problem of misdetecting a vehicle in a next lane as an object or target.

SUMMARY OF THE INVENTION

An object of the invention is therefore to overcome the foregoing problems by providing an object detecting system for a conveyance or craft having an object detector mounted on the conveyance, etc., which can improve the efficiency of mounting position adjustment operation in a factory, etc., while ensuring a desired accuracy of adjustment.

To achieve these objects, the invention provides a system for detecting an object, comprising: an object detector mounted on a conveyance which transmits a signal in a forward direction to scan in a horizontal direction, perpendicular to the forward direction, within a predetermined range of scanning; the object placed ahead of the conveyance in the forward direction at a position distant from the conveyance; reference position setting means for setting a reference position at a line extending to the object; distance determining means for determining a distance to the object based on an output of the object detector; mounting position determining means for determining a position of the object detector mounted on the conveyance in the horizontal direction; and correcting means for correcting at least one of the reference position and the predetermined range of scanning based on the detected distance and the determined mounting position.

BRIEF EXPLANATION OF DRAWINGS

This and other objects and advantages of the invention will be made more apparent with reference to the following description and drawings, in which.

DETAILED DESCRIPTION OF THE PREFERRED EMBODIMENTS

Embodiments of the invention will now be explained with reference to the attached drawings, wherein the same reference numerals as those used in the explanation of the prior art technique are again used.

Figure 1:
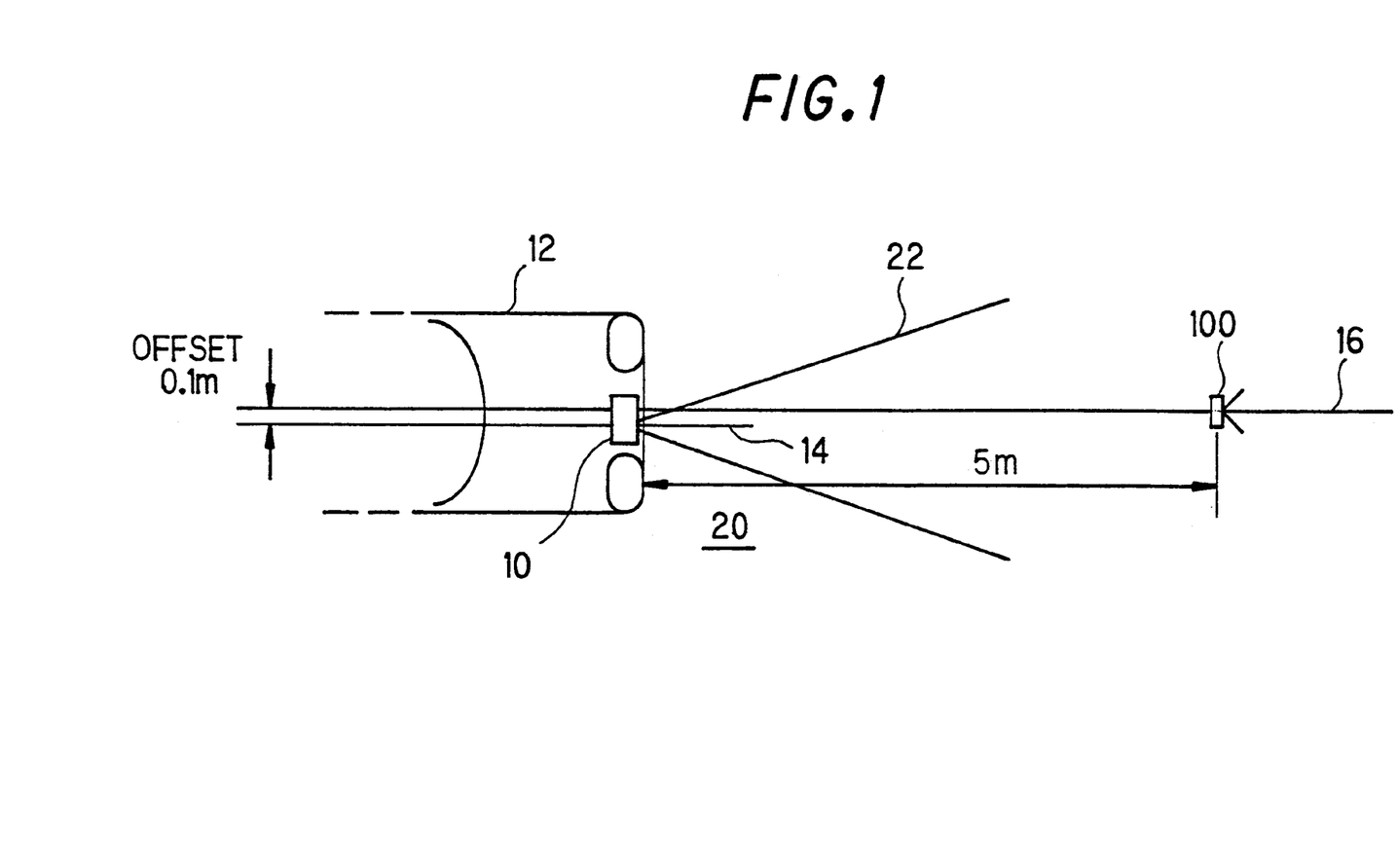
FIG. 1 is a schematic view showing the overall configuration of an object detecting system for a conveyance or craft according to the invention, taking a vehicle as an example, which has a laser radar as an object detector mounted on the vehicle.

FIG. 1 is a schematic view showing the overall configuration of an object detecting system for a conveyance or craft according to the invention. The system is illustrated in a factory assembling line taking a vehicle as an example of a conveyance.

In the figures, the laser radar (object detector) 10 is mounted in the proximity of the front grille of the vehicle 12, at a position 0.1 meters offset from or distant from the vehicle longitudinal center line 16.

In a factory assembly line, the target (object) 100 is placed on the line extending from the vehicle longitudinal center line 16 at a position 5 meters ahead of the laser radar 10. The target 100 is a plate having a height of 40 millimeters and width of 59 millimeters and having a surface highly reflective to the laser beam. The target 100 is displaceable in the vertical direction (the direction of gravity).

Figure 2:
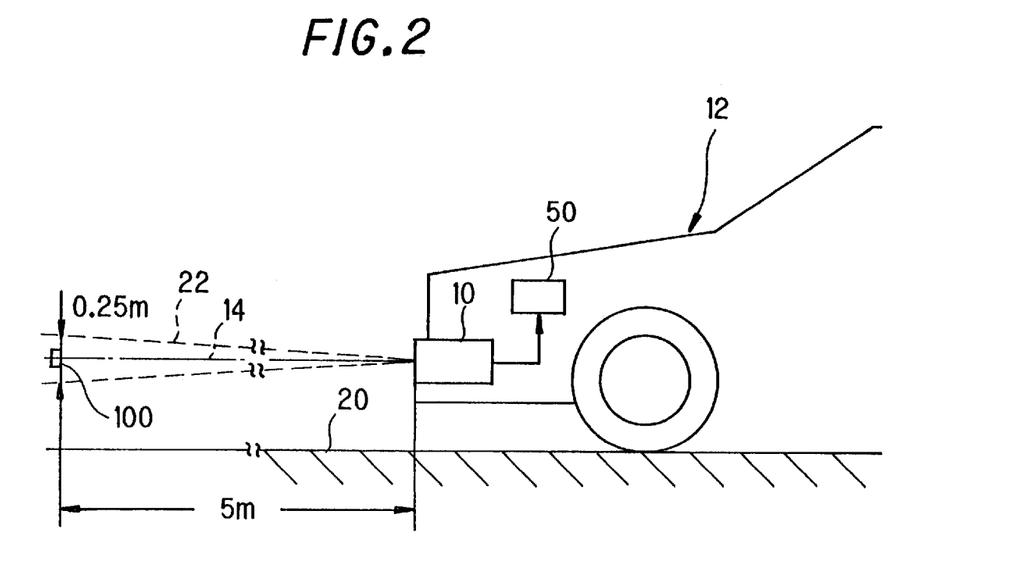
FIG. 2 is a schematic partial side view of the vehicle illustrated in FIG. 1 on which the laser radar is mounted.
Figure 3:
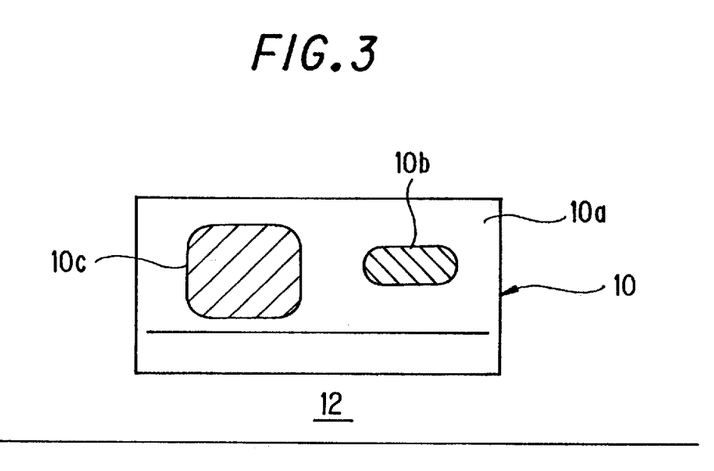
FIG. 3 is a schematic partial front view of the vehicle illustrated in FIG. 1.
Figure 4:
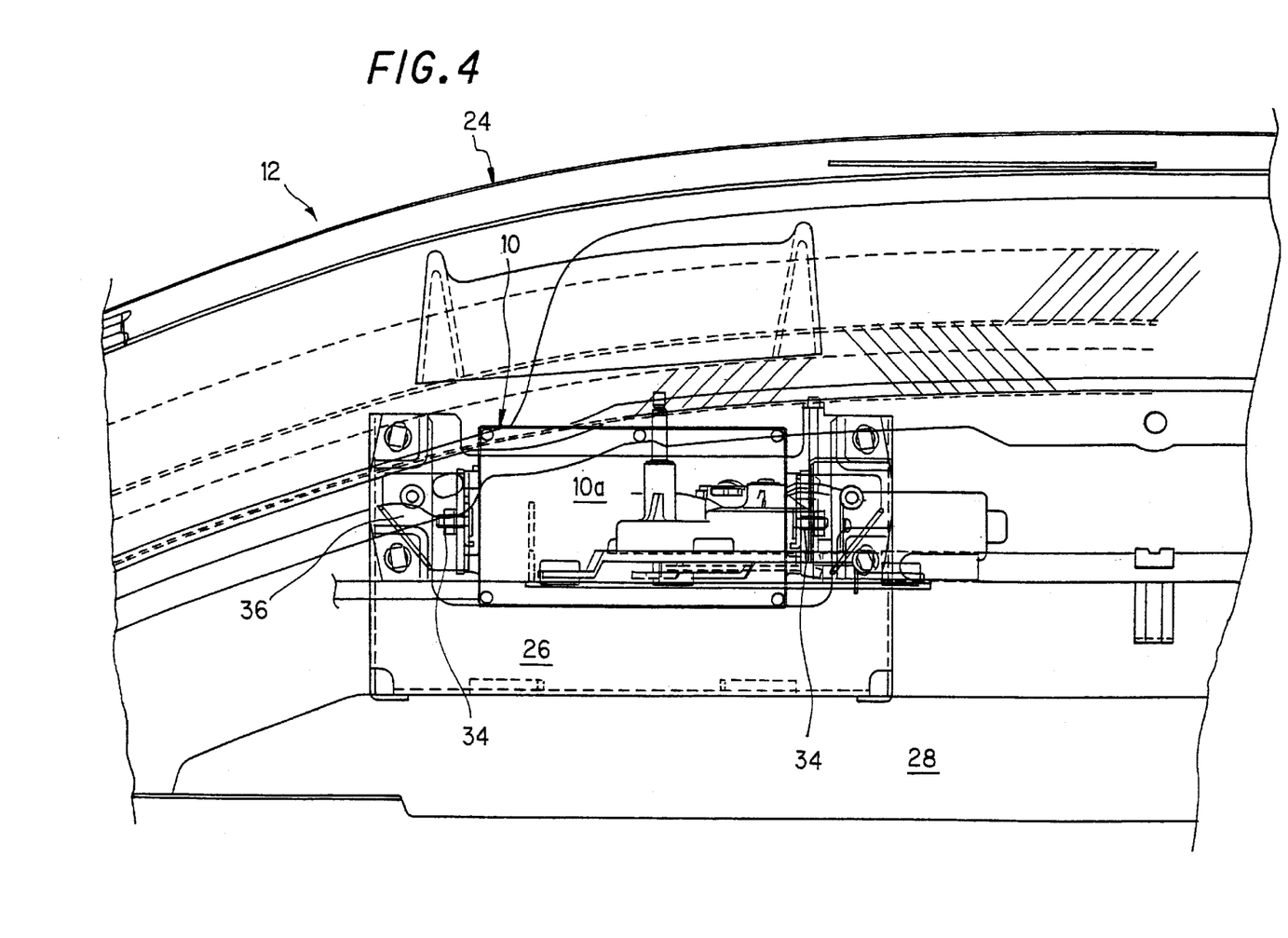
FIG. 4 is a cross-sectional plan view of the vehicle (actual vehicle) on which the laser radar is actually mounted.
Figure 5:
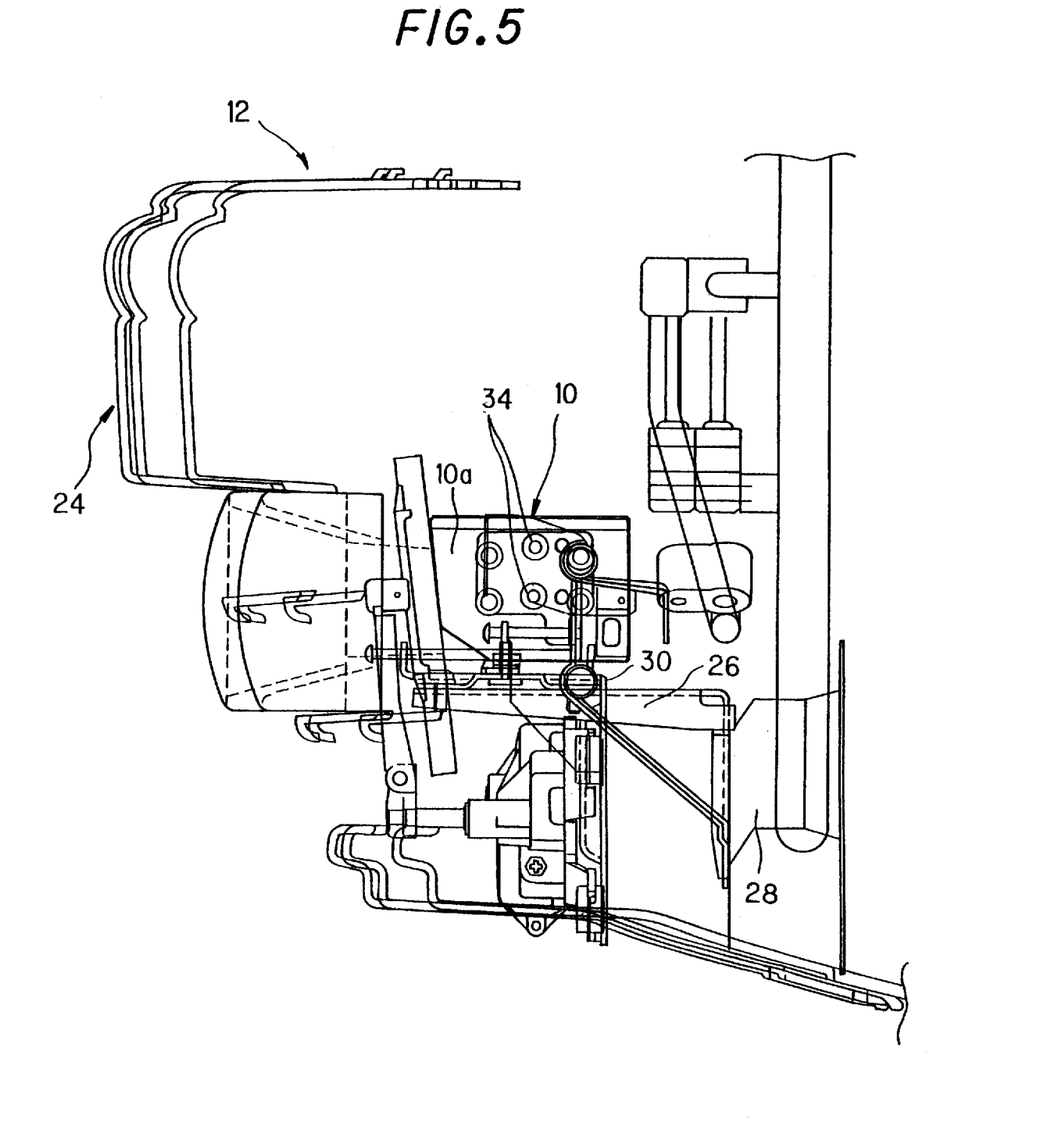
FIG. 5 is a cross-sectional side view of the vehicle (actual vehicle) on which the laser radar is actually mounted as shown in FIG. 4.

FIGS. 2 to 5 illustrate the laser radar 10 in detail, wherein FIG. 2 is a partial schematic view of the vehicle 12 on which the laser radar 10 is mounted; FIG. 3 is a partial schematic view of the vehicle 12; FIG. 4 is a plan view showing the laser radar 10 as actually mounted on the vehicle 12; and FIG. 5 is a cross-sectional side view taken perpendicular to the view of FIG. 4.

As illustrated, the laser radar 10 has a housing 10a which is mounted close to a front bumper (not shown in FIG. 1, but illustrated in FIGS. 4 and 5 with reference numeral 24) and houses the laser radar main unit (not shown).

The laser radar 10 transmits or emits a laser beam (which is a narrow coherent beam of electromagnetic energy in the form of light), through a window 10b opened through the housing 10a, in the horizontal direction parallel with a road surface 20 on which the vehicle 12 travels, and receives an echo or energy reflected from an objector or target (such as another vehicle present ahead of the subject vehicle 12) through a second window 10c opened through the housing 10a. In the figures, reference numeral 22 indicates the laser beam, while reference numeral 14 indicates the central axis of the laser beam transmitted from the laser radar 10.

For ease of understanding, FIGS. 1 to 3 schematically illustrate the laser radar housing 10a and the mounting thereof on the vehicle 12. The actual mounting of the housing 10a is shown in FIGS. 4 and 5.

Practically, the housing 10a is attached to a body frame 28 of the vehicle 12 by a stay 26 at an appropriate location underneath the front bumper 24. More specifically, the housing 10a is affixed to the stay 26 through an adjustable bracket 30. At the time of vehicle assembly, the housing 10a is rotated to a position at which the central axis 14 of the transmitted beam is approximately parallel with the road surface 20 and fastened at the position to the stay 26 by a bolts 34. The stay 26 is provided with adjusting screws (not shown) for allowing slight adjustment of the mounting position.

For ease of understanding, the target 100, the vehicle 12, the laser radar housing 10a as well as the offset are exaggerated or simplified in the figure and are not always in the same relative sizes.

Figure 6:
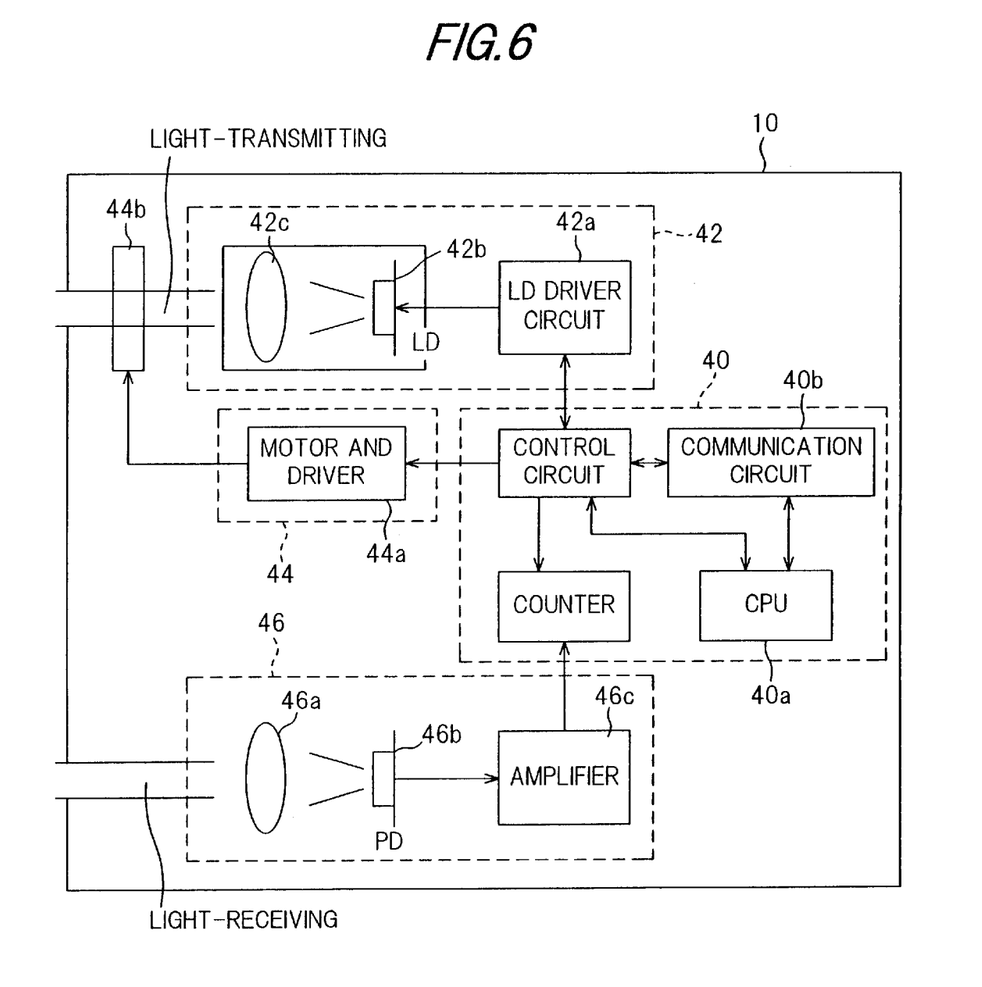
FIG. 6 is a block diagram showing the detailed configuration of the laser radar illustrated in FIG. 1.

FIG. 6 is a block diagram showing the detailed configuration of the main unit of the laser radar 10.

In the figure, reference numeral 40 indicates a range finder section in which a CPU 40a generates a command. The command is forwarded to a light-transmitting section 42 in which a LD drive circuit 42 is driven to excite a LD (Laser Diode) 42b to transmit the laser beam. At the same time, in a scanning section 44, a mirror 44b is rotated by a motor and driver circuit 44a to conduct scanning.

Figure 7:
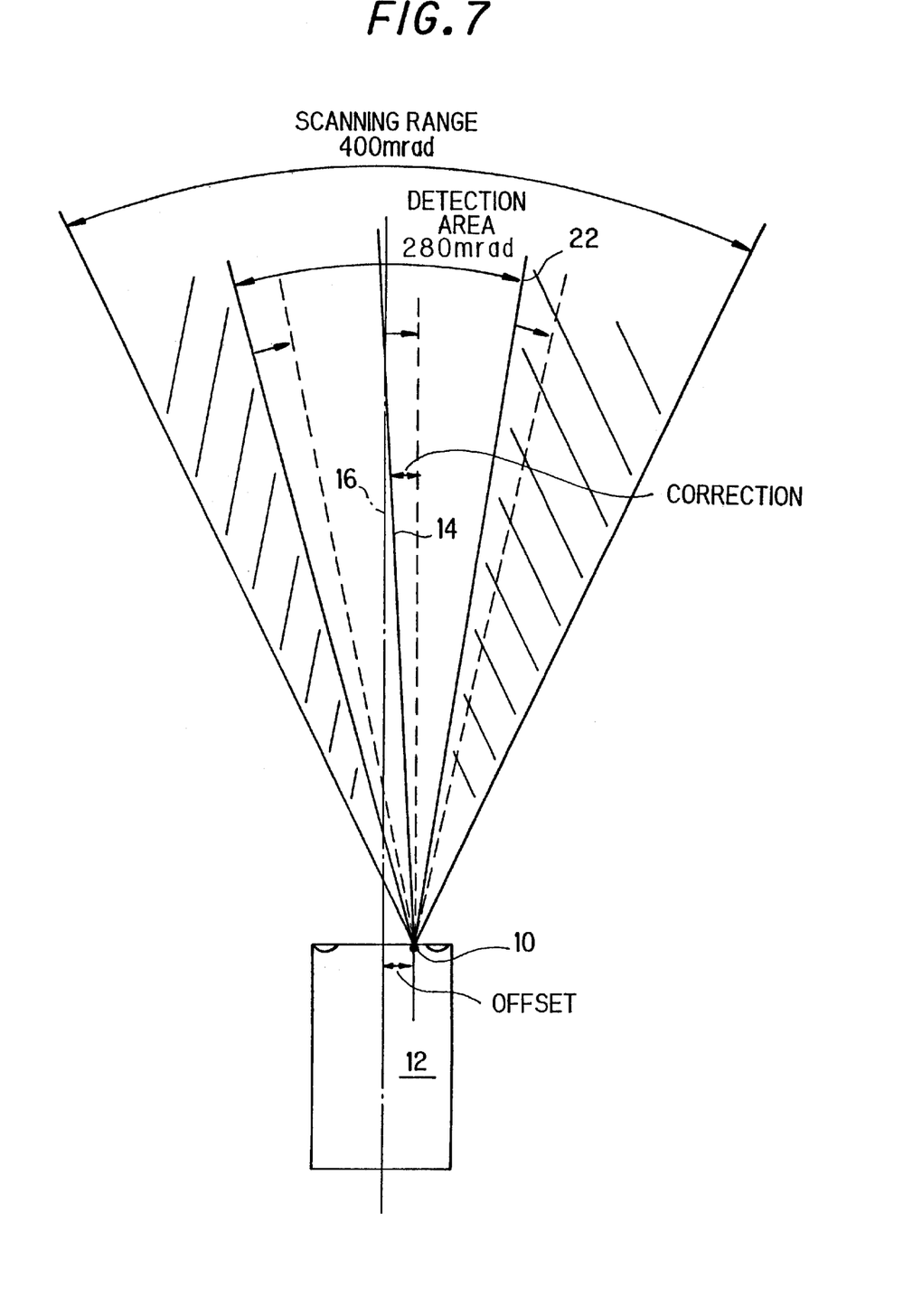
FIG. 7 is an explanatory plan view showing the range of scanning and the detection area of the laser radar illustrated in FIG. 1.

FIG. 7 is an explanatory plan view showing the transmitted beam. The laser radar 10, attached to the vehicle body frame 28 in the manner explained with reference to FIGS. 4 and 5, has a possible range of scanning of 400 milliradians (in terms of angle). In the scanning range, the laser radar 10 is set with a detection area of 280 milliradians (in terms of angle) in which scanning is conducted. The detection area is slightly adjusted for in a software manner by utilizing a computer program in the aiming (mounting position adjustment) as will be explained later.

The target 100 has the height of 40 millimeters in the vertical direction as mentioned above. Since the transmitted laser beam spreads in the vertical direction by 250 millimeters at 5 meters ahead as illustrated in FIG. 2, the target 100 can surely be placed in the transmitted beam. The target 100 is first moved up and down to be placed in position just front of the vehicle 12 and is then displaced to a position 5 meters distant from the vehicle 10 such that the target 100 is situated within the emitted beam.

Returning to the explanation of FIG. 6, the light (echo) reflected from the target 100, etc., is received in a light-receiving section 46. Specifically, the reflected light is received by a light-receiving lens 46a and PD (photodiode) 46b, and the signal output by the PD corresponding to the light received thereby is amplified by an amplifier 46c. The amplified signal from the PD is forwarded to the range finder section 40, in which the CPU 40a determines or detects the presence of the target 100, etc.

The CPU 40a also detects the range (distance) to the target 100, etc., by measuring the elapsed time between the transmission of the signal and the reception of the return signal, and the direction thereof by sensing the direction in which the light (beam) is transmitted. The output of the range finder section 40 is sent via a communication circuit 40b to an ECU (Electronic Control Unit) 50 for vehicle operation control shown in FIG. 2.

Figure 8:
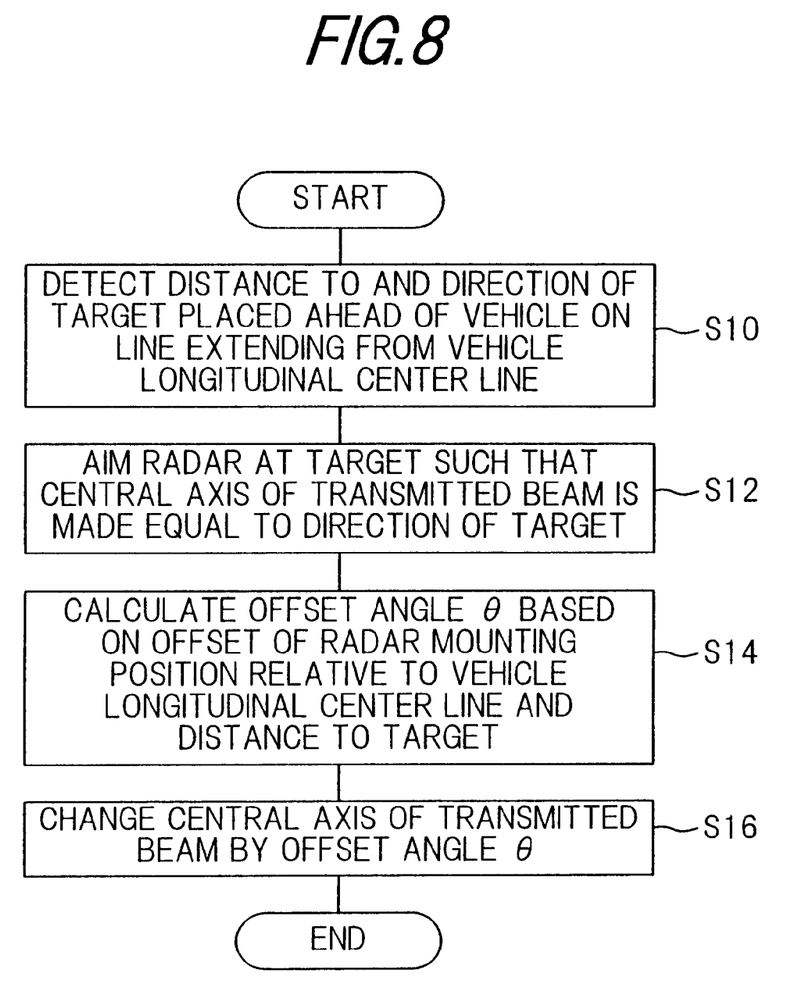
FIG. 8 is a flow chart showing the operation, more particularly adjusting for the radar mounting position, of the system illustrated in FIG. 1.

FIG. 8 is a flow chart showing the operation of the system according to the invention.

Before entering the explanation of the figure, the problems to be solved by the invention is again referred to.

As mentioned above, since it is difficult to prepare the testing range (site) of not less than 40 meters, the range should preferably be shortened to, for example, 5 meters as shown in FIG. 13. However, if the target 100 is placed at such a close position, the influence of the offset becomes large.

This may be solved if the laser radar 10 is mounted on the vehicle 12 such that the central axis of transmitted beam is aligned with the vehicle longitudinal center line 16. However, this restricts the freedom in vehicle design and may lower vehicle manufacturing efficiency.

Alternatively, the target 100 may be placed at a position offset from the vehicle longitudinal center line by the same amount as that of the laser radar 10. However, since the amount of offset is different for different kind of vehicles, this requires additional work to determine the amount of offset for each kind of vehicle. Moreover, this would introduce a source of positional error in positioning the target 100 in the offset position.

Alternatively, the laser radar 10 may be mechanically or physically adjusted by using the aforesaid the adjusting screws provided at the stay 26, although this requires additional tedious work.

In view of the above, the embodiment is configured to adjust for the laser radar mounting position in a software manner by utilizing a computer program.

The operation of this radar mounting position adjustment is explained with reference to FIG. 8. Specifically, the operation is conducted by the CPU 40a in the range finder section 40.

The program begins in S10 in which the laser radar 10 scans to detect the distance to and the direction of the target 100, placed at the line extending from the vehicle longitudinal center line 16 and at the position 5 meters ahead of the vehicle, in the manner explained with reference to FIG. 6. Since the laser radar 12 receives a light reflected from other rigid materials existing around the target 100, when a plurality of objects are revealed, the closest one from among revealed objects is selected as the target 100. In order to decrease the noise or disturbance as much as possible, while absorbing possible radar mounting positional errors, the detection area at this step is practically decreased relative to that mentioned above, to 120 milliradians consisting of ±60 milliradians from the central axis of the transmitted beam 14 (the detection area first mentioned above is shown throughout the figures).

Figure 9:
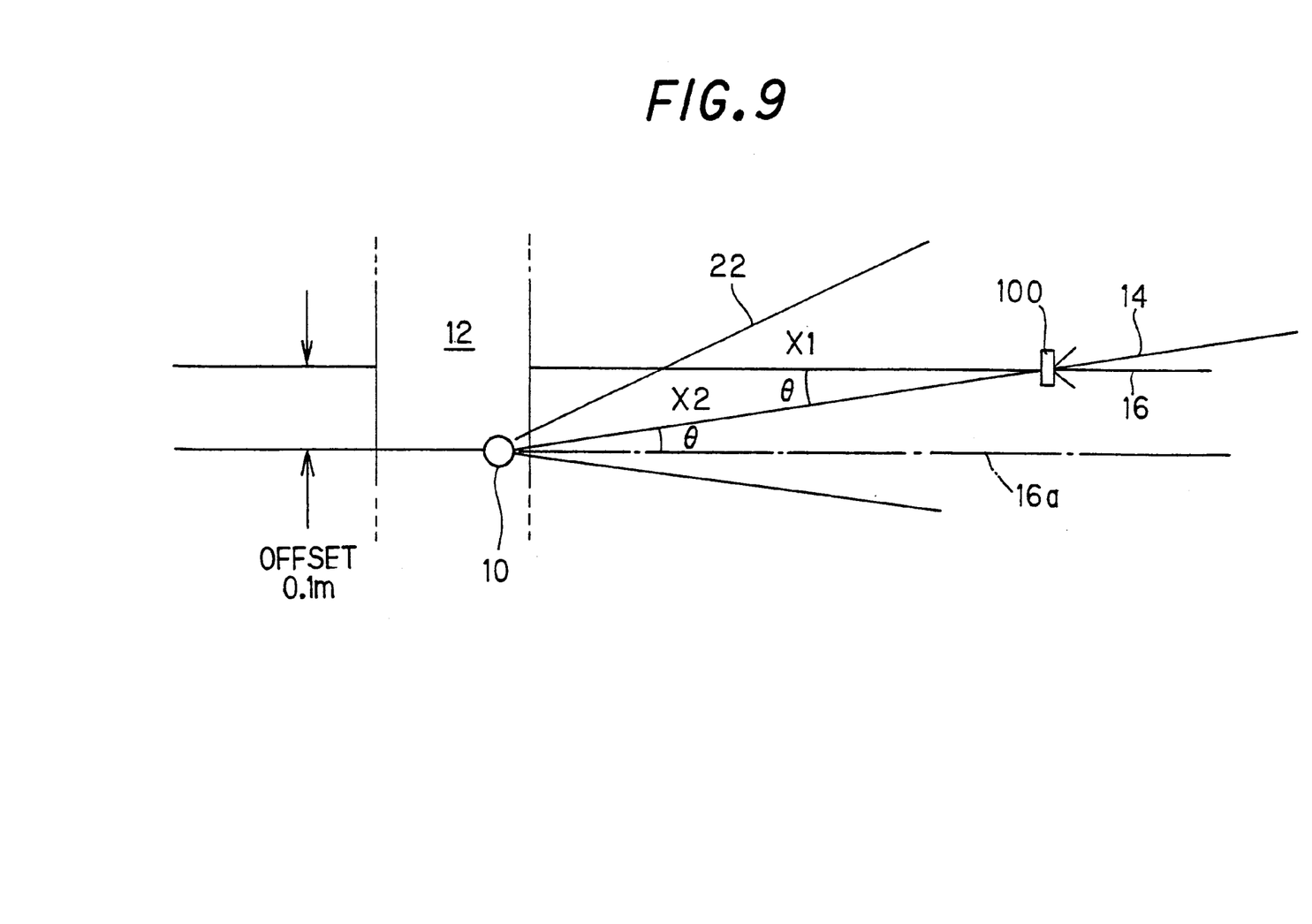
FIG. 9 is an explanatory view showing the aiming of the central axis of the beam transmitted from the laser radar at a target placed ahead of the vehicle such that the central axis of the transmitted beam is made equal to the direction of the target, as referred to in the flow chart of FIG. 8.

The program then proceeds to S12 in which the central axis of the transmitted beam 14 is aimed at the target 100. Specifically, the direction of the central axis of the transmitted beam 14 is changed from the initial value by an amount corresponding to the direction of the target 100 such that the central axis of the transmitted beam 14 is made equal to the direction of the target 100 as illustrated in FIG. 9. The central axis of the transmitted beam 14 at this stage deviates by the angle of offset θ from a inherently desired direction 16a which is parallel with the vehicle longitudinal center line 16.

Figure 10:
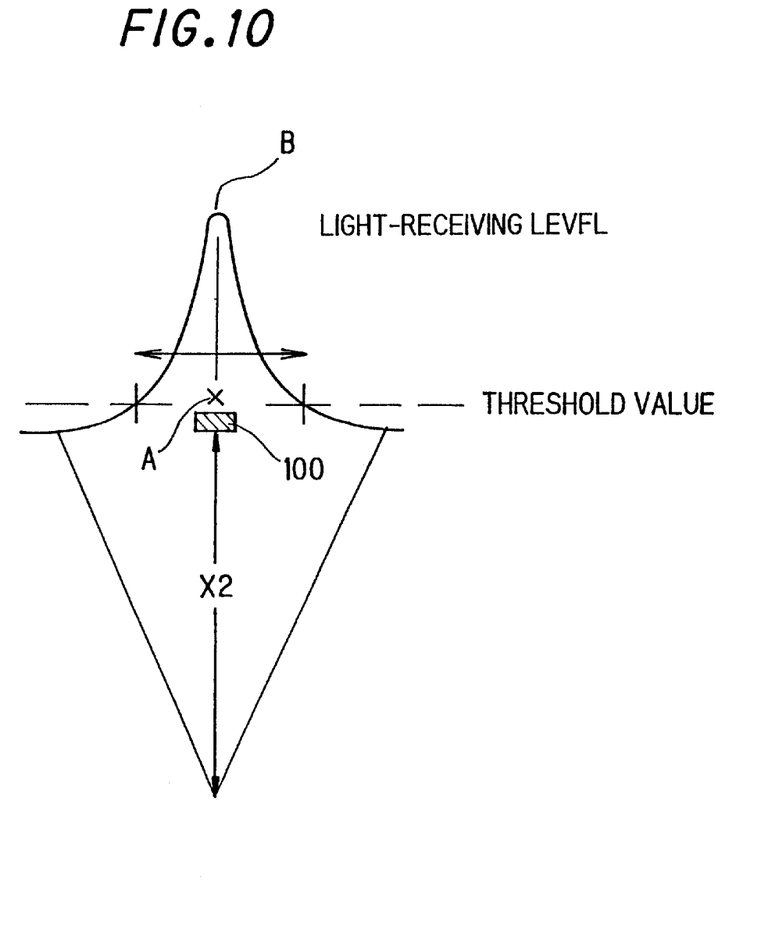
FIG. 10 is an explanatory graph showing the setting of a threshold value of the light-reception level in order to facilitate the procedure of aiming referred to in the flow chart of FIG. 8.

In this aiming, since the distance is so small that the laser radar 10 may receive the light reflected from other than the target 100 as mentioned above, if it does, the light-receiving level output from the light-receiving section 46 will be characterized as shown in FIG. 10, making the aiming difficult. In the embodiment, therefore, a threshold value is appropriately set to define an intermediate portion A in a region exceeding the threshold value such that the direction of signal transmission at a time when any point in the intermediate portion A is detected, is determined to be the detected direction of the target 100, i.e., the central axis of transmitted beam 14.

It should again be noted that the direction of the target is detected from the direction of transmitted signal (beam) at a time when the transmitted signal is returned (i.e., the light is received). The embodiment may alternatively be configured to determine the direction as corresponding to peak B (shown in FIG. 10) of the level as the direction of the target 100.

The program proceeds to S14 in which the offset angle θ is calculated or determined from the offset (i.e., 0.1 meter) and the distance X1 (i.e., 5 meter) from the vehicle 12 to the target 100. FIG. 9 illustrates the offset angle θ and the distance X1. Since the offset is known from specifications of the vehicle 12 and the distance X is a predetermined value, the values are stored in the memory of the CPU 40a beforehand and are read here.

Alternatively, the distance X1 may be measured when the aiming is conducted. Moreover, since the distance X1 is sufficiently larger than the offset, the distance detected in S10 (which is illustrated as X2 in FIG. 9) may instead be used as the distance X1.

Figure 11:
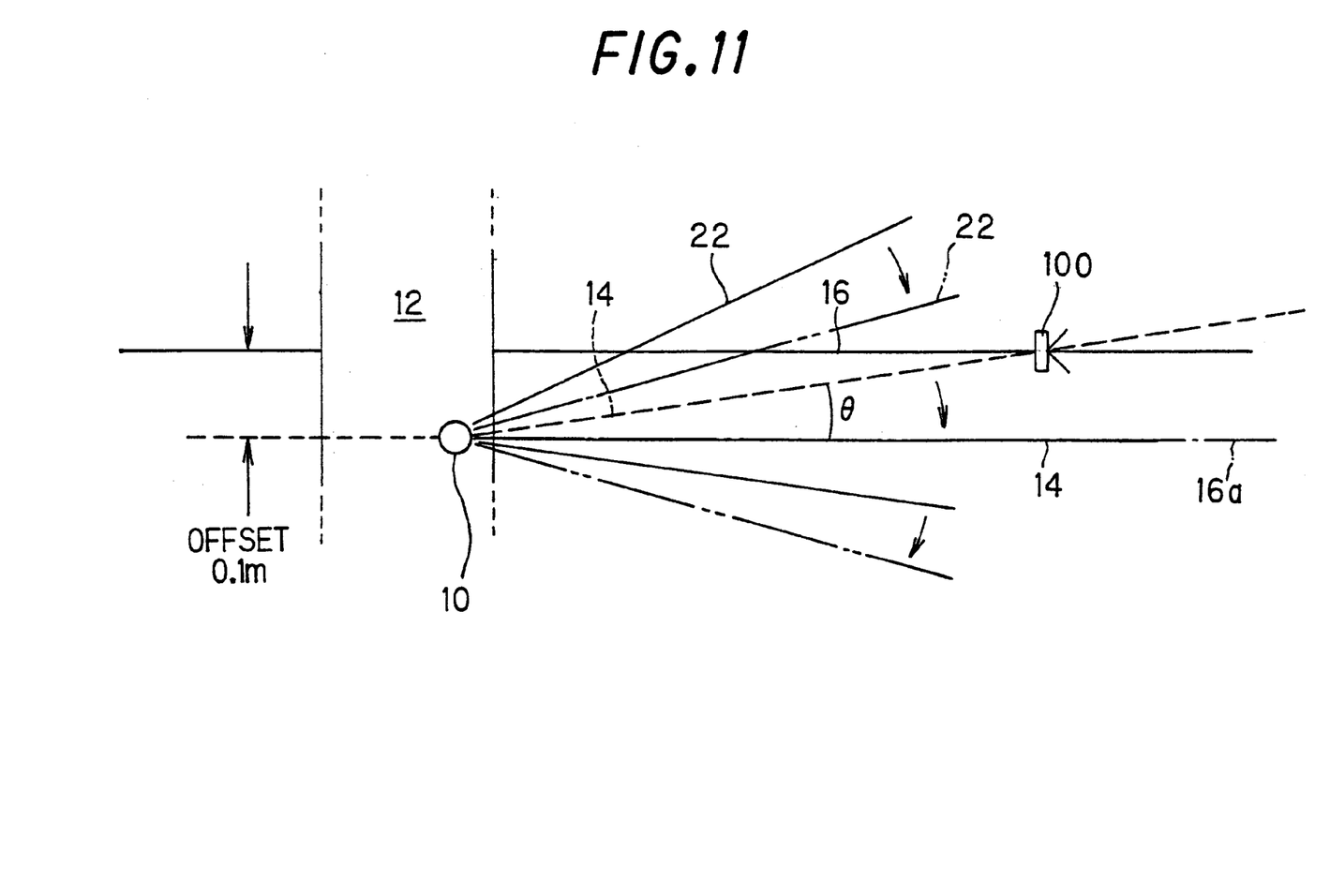
FIG. 11 is an explanatory view showing the correction of the central axis of the transmitted beam (the center of the detection area), i.e., the radar mounting position, using an offset angle referred to in the flow chart of FIG. 8.

The program then proceeds to S16 in which the central axis of the transmitted beam 14 is changed or corrected by the offset angle θ to correct the detection area (280 milliradians) within the scanning range (400 milliradians) as illustrated by phantom lines in FIG. 11.

With this, by once aiming at the target 100 and then by correcting the aiming by the offset angle, the radar mounting position is adjusted for such that the central axis of the transmitted beam 14 is aligned with the inherently desired direction 16a (which is in parallel with the vehicle longitudinal center line 16) as illustrated in FIG. 11, without being influenced by the offset.

The procedures in S12 and S16 are conducted, to be more specific, such that in S12 the data indicative of the position (direction) of the central axis of the transmitted beam 14 is temporarily stored in a memory (RAM, not shown in FIG. 6) and in S16 the data (the initial value) indicative of the position (direction) of the central axis of the transmitted beam 14, i.e., the center of the detection area, stored in a memory (EEPROM, not shown in FIG. 6) of the CPU 40a is rewritten.

Thus, since the checking range is shortened and the radar mounting position adjustment is conducted in a software manner by utilizing a computer program, the efficiency of radar mounting position adjustment is improved, while ensuring the desired accuracy of mounting position adjustment.

Having been configured in the foregoing manner, the embodiment is configured to have a system for detecting an object (target reflector or target 100), comprising: an object detector (laser radar 10, range finder section 40, CPU 40a, etc.) mounted on a conveyance (vehicle 12) which transmits a signal (beam 22) in a forward direction to scan in a horizontal direction, perpendicular to the forward direction, within a predetermined range of scanning (280 or 120 milliradians in angle); the object (target 100) placed ahead of the conveyance in the forward direction at a position distant from the conveyance; reference position setting means (CPU 40a, S10, S12) for setting a reference position (center of the detection area corresponding to the central axis of the transmitted beam 14) at a line extending to the object; distance determining means (CPU 40a, S14) for determining a distance (X1) to the object based on an output of the object detector; mounting position determining means (CPU 40a, S14) for determining a position of the object detector mounted on the conveyance in the horizontal direction (i.e., offset angle θ relative to the vehicle longitudinal center line); and correcting means (CPU 40, S16) for correcting at least one of the reference position and the predetermined range of scanning, more specifically the reference position based on the detected distance and the determined mounting position.

In the system, the object detector transmits a signal in the forward direction and receives a return signal, and the reference position setting means sets the reference position based on a direction of a signal transmitted at a time when the transmitted signal is returned such that the reference position is set at the line extending to the object.

In the system, the reference position setting means includes: threshold value setting means (CPU 40) for setting a threshold value in an output level of the return signal; and intermediate portion defining means (CPU 40) for defining an intermediate portion (A) exceeding the threshold value in the output level of the return signal; and wherein the reference positions setting means determines the time when any point in the intermediate portion is detected.

In the system, the reference position setting means includes: peak detecting means (CPU 40) for detecting a peak in the output level of the return signal; and wherein the reference positions setting means determines the time when the peak is detected.

In the system, the mounting position determining means determines a mounting position of the object detector on the conveyance in the horizontal direction as an offset from a longitudinal center line of the conveyance and the correcting means corrects the reference position based on the detected distance and an angle of the determined offset.

In the system, the conveyance is a vehicle 12, and the object detector is a radar 10 and the object is a target reflector 100.

In the foregoing embodiments, when the detection area is temporarily out of the scanning (maximum) range of 400 milliradians, it suffices if it is corrected to fall within the range after adjustment.

In the foregoing embodiments, although the laser radar is used as an object detector, it is alternatively possible to use another type of radar such as a millimeter electromagnetic wave (beam).

Moreover, the invention will be applied to an object detecting system having any other kind of object detector if it involves the problem of mounting position adjustment.

Furthermore, although a vehicle is described as an example of conveyance, the invention will also be applied to any other conveyance or craft or moving object, such as a motorcycle, water-craft or aircraft, if the object detector mounted thereon has the problem of mounting position adjustment.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for detecting an object positioned ahead of a conveyance in the forward direction at a position distant from the conveyance, said system comprising:

an object detector mounted on a conveyance offset from the longitudinal center line thereof, which transmits a signal in a forward direction to scan in a horizontal direction, perpendicular to the forward direction, within a predetermined range of scanning;

reference position setting means for setting a reference position at a line extending to the object;

distance determining means for determining a distance to the object based on an output of the object detector;

mounting position determining means for determining an offset position of the object detector mounted on the conveyance in the horizontal direction; and correcting means for correcting at least one of the reference position and the predetermined range of scanning based on the detected distance and the determined offset mounting position.

2. A system according to claim 1, wherein the object detector transmits a signal in the forward direction and receives a return signal, and the reference position setting means sets the reference position based on a direction of a signal transmitted at a time when the transmitted signal is returned such that the reference position is set at the line extending to the object.

3. A system according to claim 2, wherein the reference position setting means includes:

threshold value setting means for setting a threshold value in an output level of the return signal; and intermediate portion defining means for defining an intermediate portion exceeding the threshold value in the output level of the return signal;

and wherein the reference positions setting means determines the time when a point in the intermediate portion is detected.

4. A system according to claim 2, wherein the reference position setting means includes:

peak detecting means for detecting a peak in the output level of the return signal;

and wherein the reference positions setting means determines the time when the peak is detected.

5. A system according to claim 1, wherein the mounting position determining means determines a mounting position of the object detector on the conveyance in the horizontal direction as an offset from a longitudinal center line of conveyance and the correcting means corrects the reference position based on the detected distance and an angle of the determined offset.

6. A system according to claim 1, wherein the conveyance is a vehicle.

7. A system according to claim 2, wherein the object detector is a radar and the object is a target reflector.

* * * * *